US008046566B2

(12) United States Patent
Abernathy et al.

(10) Patent No.: US 8,046,566 B2
(45) Date of Patent: Oct. 25, 2011

(54) METHOD TO REDUCE POWER CONSUMPTION OF A REGISTER FILE WITH MULTI SMT SUPPORT

(75) Inventors: Christopher M. Abernathy, Austin, TX (US); Jens Leenstra, Bondorf (DE); Nicolas Maeding, Holzgerlingen (DE); Dung Quoc Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 12/120,958

(22) Filed: May 15, 2008

(65) Prior Publication Data
US 2009/0292892 A1 Nov. 26, 2009

(51) Int. Cl.
*G06F 9/50* (2006.01)
*G06F 1/32* (2006.01)

(52) U.S. Cl. ........................................ 712/216; 713/323
(58) Field of Classification Search ................... 712/216; 713/323
See application file for complete search history.

(56) References Cited

U.S. PATENT DOCUMENTS

| 5,179,685 | A  | * | 1/1993  | Nojiri ......................... 712/41 |
| 7,152,170 | B2 | * | 12/2006 | Park ........................... 713/320 |
| 7,600,101 | B2 | * | 10/2009 | Soltis, Jr. ..................... 712/228 |
| 2006/0001468 | A1 | * | 1/2006 | Siegler et al. ................ 327/291 |

OTHER PUBLICATIONS

"Impact of Dynamic Allocation of Physical Register Banks For An SMT Processor" Kato et al. Proceedings of the Innovative Architecture for Future Generation High-Performance Processors and Systems. 1527-1366/04 IEEE, The Computer Society.

* cited by examiner

*Primary Examiner* — Daniel Pan
(74) *Attorney, Agent, or Firm* — Michael J. LeStrange

(57) ABSTRACT

A method for reducing the power consumption of a register file of a microprocessor supporting simultaneous multi-threading (SMT) is disclosed. Mapping logic and associated table entries monitor a total number of processing threads currently executing in the processor and signal control logic to disable specific register file entries not required for currently executing or pending instruction threads or register file entries not meeting a minimum access threshold using a least recently used algorithm (LRU). The register file utilization is controlled such that a register file address range selected for deactivation is not assigned for pending or future instruction threads. One or more power saving techniques are then applied to disabled register files to reduce overall power dissipation in the system.

13 Claims, 5 Drawing Sheets

METHOD TO REDUCE POWER CONSUMPTION OF A REGISTER FILE WITH MULTI SMT SUPPORT

FIELD OF THE INVENTION

The present invention relates to the field of microprocessor architecture, and in particular to a method for reducing the power consumption associated with register file operations of a processor supporting simultaneous multithreading (SMT), wherein control logic manages the utilization of multiple register files allocated to specific processing threads.

Prior art high-performance microprocessors are designed for simultaneous multi-thread support in hardware.

In "Proceedings of the Innovative Architecture for Future Generation High Performance Processors and Systems (IWIA'04)", pp. 139-147, Volume 00, 2004, the article "Impact of Dynamic Allocation of Physical Register Banks for an SMT Processor", by Norito Kato et al, ("Kato"), incorporated herein by reference, discloses the architectural features of an SMT processor. Kato describes the problems managing a physical register file in a SMT processor architecture as the area dedicated to the register file, minimum access time and power consumption have commensurately increased with process technology scaling. A Kato discloses a method whereby a physical register file is divided into a plurality of sections and dynamically allocated among several processing threads in order to reduce register file access time and reduce power dissipation associated with large register file sets.

The requirement to support simultaneous multithread processing considerably increases the amount of storage area needed to hold all architectural states and register contents associated with discrete processing threads. Although Kato describes the problems of increased register file space in SMT processors, it does not propose a solution for reducing power consumption in large register files, which is advantageous for portable computing devices.

In general, a SMT architected system does not operate at the highest supported SMT mode of simultaneous threads. SMT architected processors may support, for example, 16 threads in parallel, but there are many periods during operation of the processor, in which a considerably smaller number of threads are executing. During normal operations of SMT processing, the number of currently used threads may increase or decrease from time to time. In particular, a decrease of used SMT modes, occurring when, for example, the number of threads decreases from 16 to 7 only, will cause the register files supporting the SMT modes to consume more electrical power than it is basically needed for the operation of the system. When for example the number of threads decreases from 16 to 7, it is basically possible to switch from a SMT 16 mode into a SMT 8 mode which is able to handle a number of 7 threads.

The operation of a large-size register file needs a relatively high amount of electrical power. Prior art SMT processors, including Kato do not address the issue of power consumption associated with large register files.

SUMMARY OF THE INVENTION

It is an objective of the present invention to provide a SMT processor having a register file operable in a reduced power mode to exploit the case where all of the register entries of the register file are not being utilized.

It should be noted that a straight-forward approach to switch off the power from certain physical register entries of the register file is not feasible because the register file entries are usually not allocated blockwise to a single one of the multiple threads. A blockwise allocation of multiple entries is often advantageous since it enables more efficient power utilization with reduced overhead. Instead, mapping control logic matches individually located register entries to a single thread. For example, when a register file has a plurality of 128 register entries, prior art mapper logic maps, for example, 32 architected states of a single thread to the entries having the number of, for example: 21, 37, 41, 55, 68, 97, 101, 112, 117, etc. This "distributed" allocation of registers to threads has many advantages for managing the register data and associated status information. However, this is a serious and obstacle when entries physically co-located are supposed to be turned off. Because even though they are located close to each other, the register files may be used by different threads, which may be active or inactive. This must be taken into account, when particular registers are selected for being switched off temporarily.

According to a preferred embodiment, the register file is partitioned such that multiple consecutive entries, for example, those bits connected to a local bit line, can be turned-off together. The preferred embodiments disclose a method which determines the occurrence of an instruction thread during runtime of the processor, which results in significant power dissipation. Then, a sub-area of a particular register file associated with the processing thread is determined to be a candidate to be powered down, which results in no additional data being stored in the selected register file. The register file is selected for power down is flagged by a status bit and then a power saving technique is applied to the sub-area such as reducing the supply voltage, disable precharge, clock gating or voltage island partitioning. The power savings may be significant in cases in where the sub-area is relatively large. A person of ordinarily skill in the art will appreciate that additional control logic is required to select the register file sub-area most advantageous for power down selection.

A reduction in the number of processing threads currently executing may provide a triggering event for determining whether a change of operation has occurred that will enable one or more register file sub-areas to be powered down. resulting in fewer instruction threads in process.

Then, after some period of operation in such energy-saving operation mode, if the processor needs to increase the number of threads and must switch, for example from SMT 8 to SMT 16 mode, a control signal reactivates the previously disabled sub-area.

A preferred embodiment restricts the register address range of a multi-SMT supportive register file to the needed amount of register entries required to support the given architecture and operational requirements including a predetermined number of rename registers by marking corresponding entries as "Disabled" in the mapper control logic, such that any rename registers in that sub-area of the register file are not reallocated to new requests. subsequently, this sub-area will end up with no more register entries than is required and the sub-area can be switched off.

An alternative embodiment transfers the contents of a particular register file segment, including all data and status information to cache and then rewrites to a an active register file that is otherwise underutilized. is based on the idea to determine such sub-area to be switched off in near future, to move the register entries including all data and status information to memory or cache, and write them into an alternative region of the register file in respective new register entries, when it is foreseeable that enough memory space is available in this region of the register file. Next, the register file subarea from which the cached data originated may also be switched off.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DETAILED DESCRIPTION OF THE PREFERRED EMBODIMENT

Figure 1:
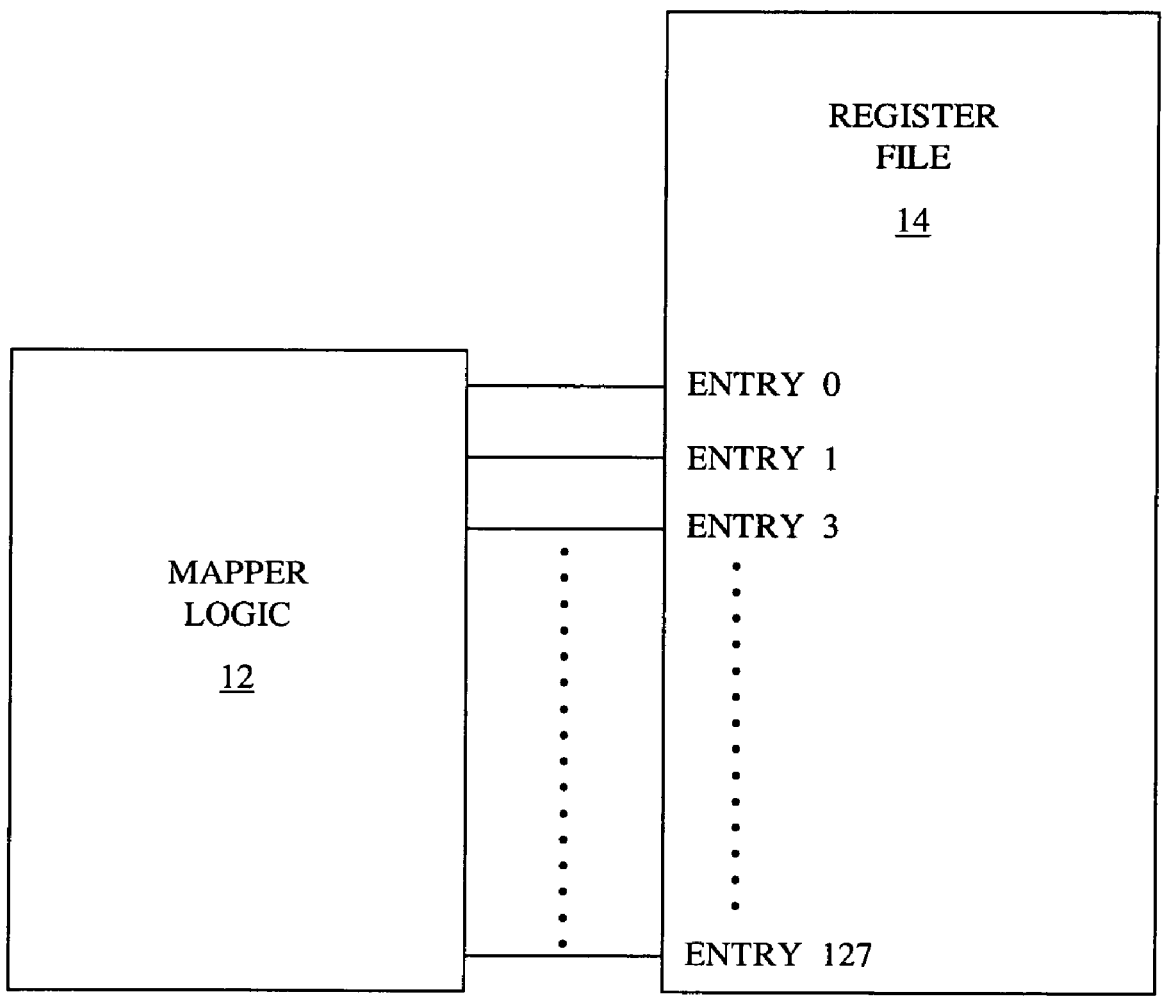
FIG. 1 illustrates a block level diagram of a prior art register file element with mapping logic to select register file entries in encoded form.
Figure 2:
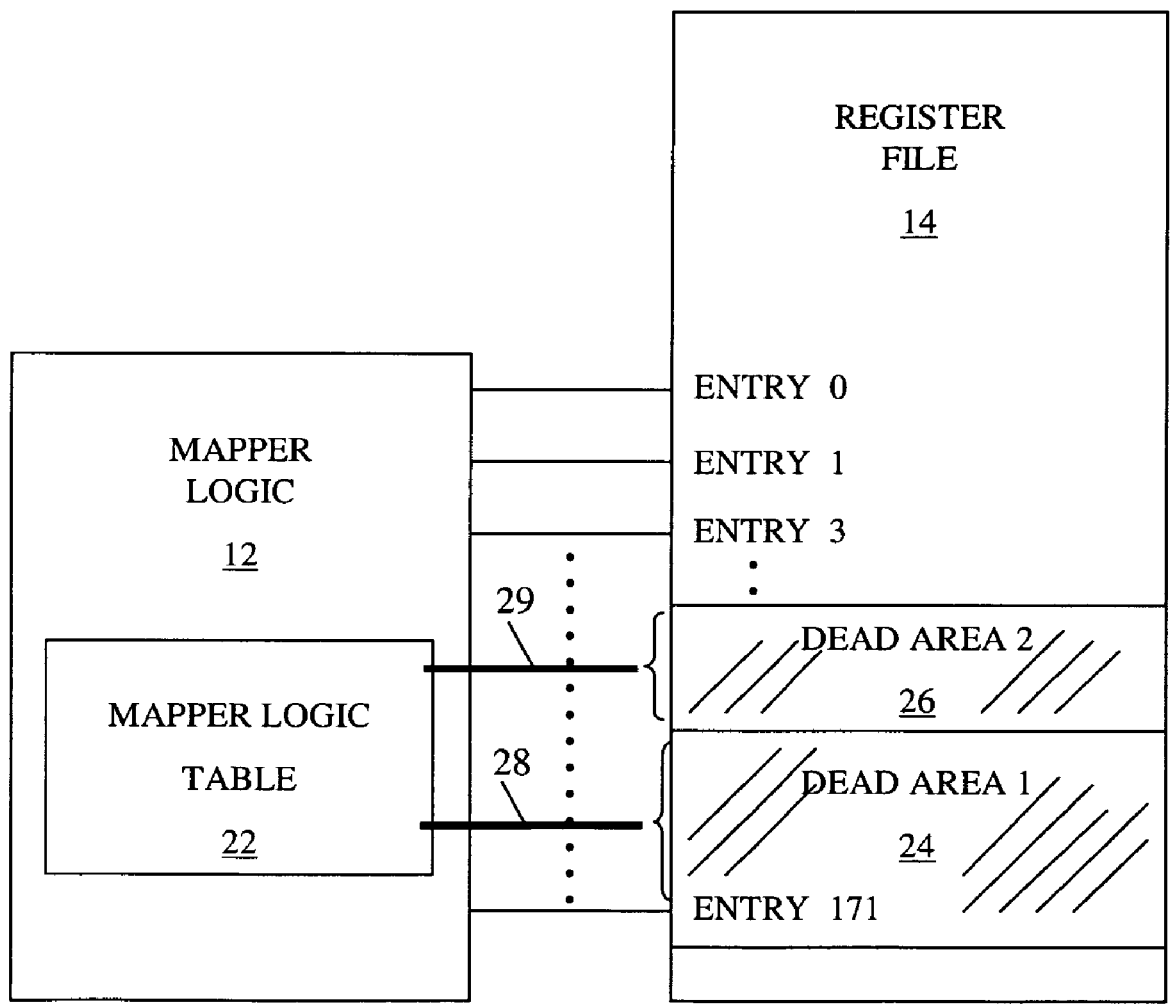
FIG. 2 illustrates a block level diagram of a register file element with mapping logic to identify and control selected sub-areas of the register file according to a preferred embodiment.
Figure 4:
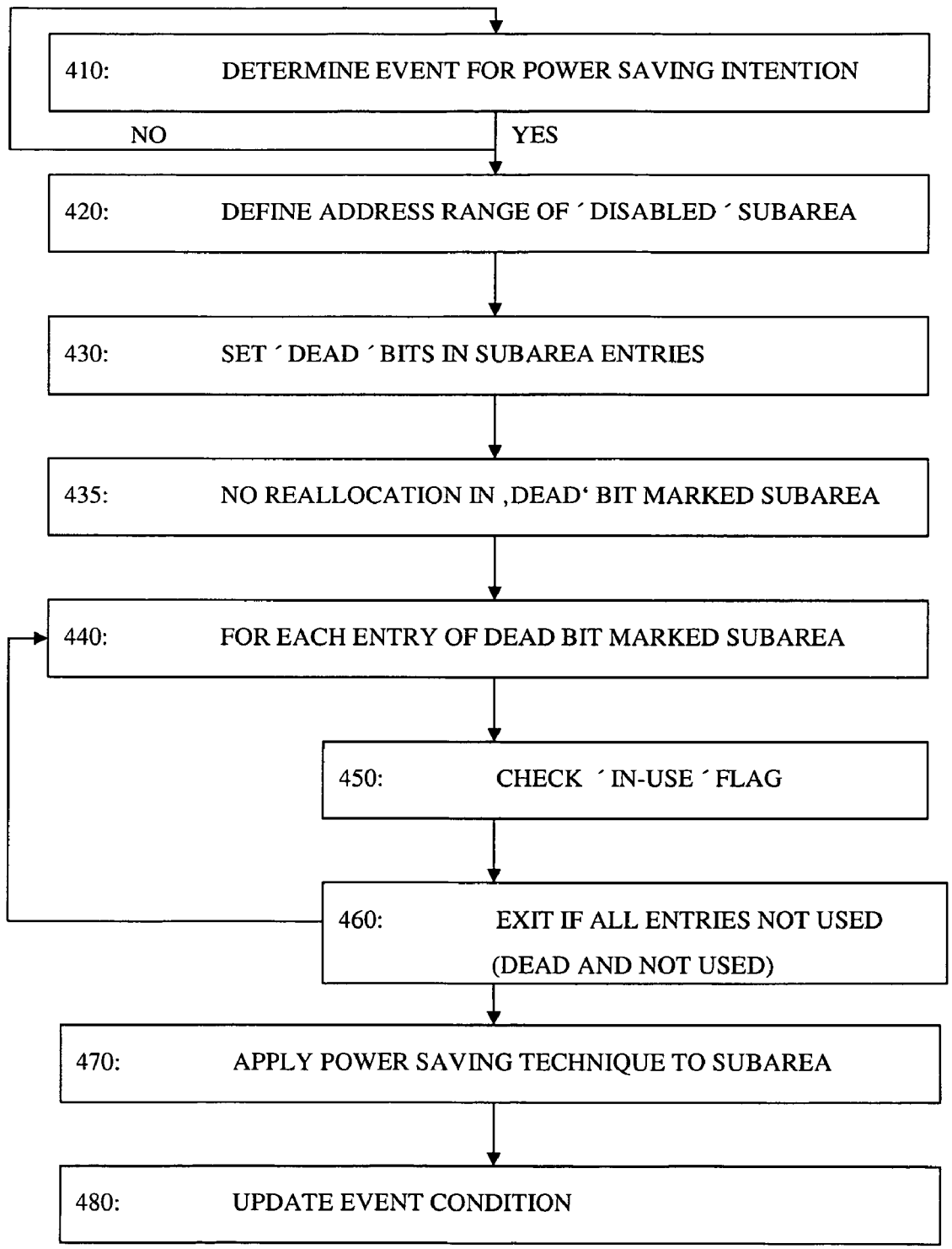
FIG. 4 illustrates a method of disabling select register file entries based on the capacity and current processing requirements in a simultaneous multi-threading architected processor.

Referencing to FIG. 2, the mapper logic previously described is modified by logic 22, which implements the method steps described in FIG. 4. Logic 22 manages the overall register file space by switching off single regions or sub-areas 24, 26 in the register file 14, when they are not required during normal operation of the SMT processor. The control to switch OFF and ON sub-areas 24 and 26 is accomplished via control lines 28 and 29, respectively which have a fan-out for each entry of the sub-areas.

Figure 3:
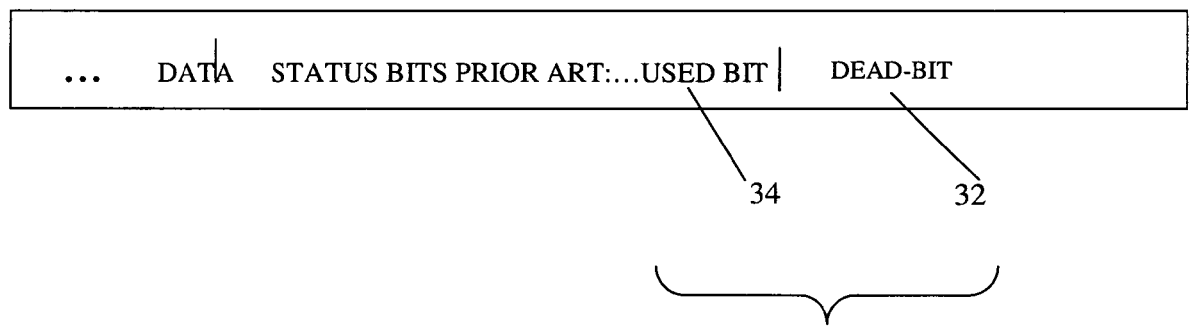
FIG. 3 depicts a dataset showing details of mapping logic table entries in accordance with the preferred embodiment.

FIG. 3 shows an exemplar mapper table entry dataset located in mapper logic 12. "DEAD bit" 32 is introduced to ensure that a particular register file entry is not reallocated to a register file sub-area that has been disabled. Each physical entry of the register file will have a corresponding mapper entry. A prior art "USED"_bit 34 is included in order to get information, when a sub-area is selected and made ready for powering down. This is the case, when all DEAD bits 32 of a sub-area are asserted and all USED bits 34 are OFF for the same sub-area. Of course, a different register file entry will be allocated, which is associated with a register file entry in a different area (active area), in order to satisfy the needs of the SMT processor in any given operational state.

With further reference now to FIG. 4, which illustrates the control flow implemented with mapper table logic 22 of the mapper logic, in a first step 410 a reduction in the number of currently executing processing threads triggers a reconfiguration of register file resources to save power. For example, a triggering event occurs when the current number of threads performed by the SMT processor falls beneath a predetermined threshold level. Preferred threshold levels are of course 2, 4, 8, 16, 32, etc. When such event occurs, it can be reasonably assumed that a respective reduced number of register file entries are needed for the prospective and pending operations of the SMT processor.

The determination of such a threshold may be implemented either with hardware (based on thermal sensors) or most likely controlled by software, either by the operating system or by power management software layers. Triggering of the maximum number of processing threads may be recognized by a change of the status register indicating the current SMT mode.

If a minimum processing thread threshold is detected, step 420 defines a respective address range of the register file to be electrically deactivated.

During the immediately subsequent operation, the current contents of the register file entries in this address range selected for deactivation are not discarded because they hold architectural states from a still active thread. During further subsequent operation of the processor, however, the number of entries required in the sub-area selected for deactivation will diminish, and finally all register file entries from this region will no longer be needed, such that this will become a "DEAD" sub-area of the register file within the defined address range.

Of course, the address ranges may differ in size. When the number of threads is reduced from 32 to 16 a larger address range may be selected for deactivation and a smaller address range when the number of threads is reduced from for example 16 to 8. In the case of fewer active processing threads, a previously deactivated register file sub-area will remain disabled to maximize potential power savings. If the SMT processor can tolerate disabling additional register file sub-areas, then such least recently used sub-areas will similarly be disabled.

The size of the suitable address ranges of the register files selected for deactivation may be as small as a single register. A person of skill in the art will appreciate the address range may be determined by the capacity to build such a register file, as well by a reasonable trade-off analysis concerning the interface signals and the control logic necessary to implement a finer or a coarser degree of selectivity.

Assuming a SMT processor capable to operate with up to 16 threads simultaneously, and each thread having 32 architectural registers, one may need 512 register file entries excluding registers added for rename purposes. In case the processor changes operation to 8 threads, a range of 256 entries in the register file may be marked DEAD based on the disclosed invention.

Referring again to FIG. 4, step 430 marks each register file entry from the defined sub-area address ranges as "disabled" by asserting the "DEAD" bit 32 (FIG. 3) true. Reallocation logic then reads the DEAD bit and prevent the selected sub-area address range from being reallocated, step 435. The reallocation logic will then try to reallocate a different free entry. This can be achieved by subsequently checking the register file entries. In a preferred embodiment of this particular step, the reallocation logic is informed from the address range as defined in step 420 as "Disabled", and will therefore look for free entries only in register file areas outside the address ranges of any previously disabled sub-area.

Various algorithms and techniques can be used in combination with the disclosed invention. The DEAD bit may be combined with an already available "USED" bit, which indicates, that the entry is currently used in an architected state yet to be completed and may not be overwritten, see FIG. 3, control bits 32 and 34, respectively.

In step 440 a loop is entered comprising each entry of a newly defined "Disabled" register file sub-area 24 or 26.

In the first step 450 of this loop a "used" flag is checked in order to determine, whether the respective register file entry is still required for any currently executing processing thread. Eventually, all rename entries within the "Disabled" state area have been completely cast out because a more recent instruction with the same logical target has been completed.

Step 460 performs a decision if all register file entries of the predefined Disabled sub-area are no longer needed by the processor. In case there is still at least one thread requiring access to a selected register file sub-area, control signals are fed back to step 440 in order to reenter the loop and check if the remaining entries are still "in-use". In subsequent processing, step 460 will result in exiting the loop, when all register file entries comprised thereof are no longer needed by the processor.

Then, in step 470 a power saving technique is employed for the Disabled register file sub-area area defined in step 420 above, such as reducing the supply voltage, disabling precharge or power supply or clock gating as will be appreciated by those skilled in the art.

In an optional further step 480, the event condition for step 410 is updated, as the software knows the current number of executing processing threads. The control software is also aware of the SMT mode, e.g., 8, 16, 32, 64, . . . . The control software therefore updates the event condition in order to be able to deactivate an additional sub-area while maintaining the SMT mode, or to re-activate a sub-area which had been switched off before.

For example, when the above description of FIG. 4 resulted in switching off a register file sub-area because a mode switch from 32 to 16 threads had occurred, a new condition could read to detect the event, when the number or currently executing falls below 9 threads.

If instead the operation of the processor requires increasing the number of active threads, which requires a commensurate increase in register file resources, a previously disabled register file sub-area may be reactivated through a dedicated control signals manipulating mapper logic table entries.

Those skilled in the art will appreciate that different threshold levels other than power of two can be defined. The preferred embodiment can even be extended to a granularity of even a single register file entry. Basically, the same logic can be used here for as described above with reference to FIG. 4 with a smaller address range.

Further, those skilled in the art will appreciate that each sub-area which can be defined may be fed by a separate power supply wiring in order to facilitate switching respective subareas off and on. A respective exemplar wiring is depicted in FIG. 5.

According to a further feature of a preferred embodiment, the mechanism can be used in hardware or software, which cycles through the architected register file range issuing dummy operations (no-OPS) to each architected register. This will effectively move data out of the "disabled" address range since the data stored in the disabled address range is cast out and copied to a currently active address range because the dummy operations only allocate entries in an active address range.

Figure 5:
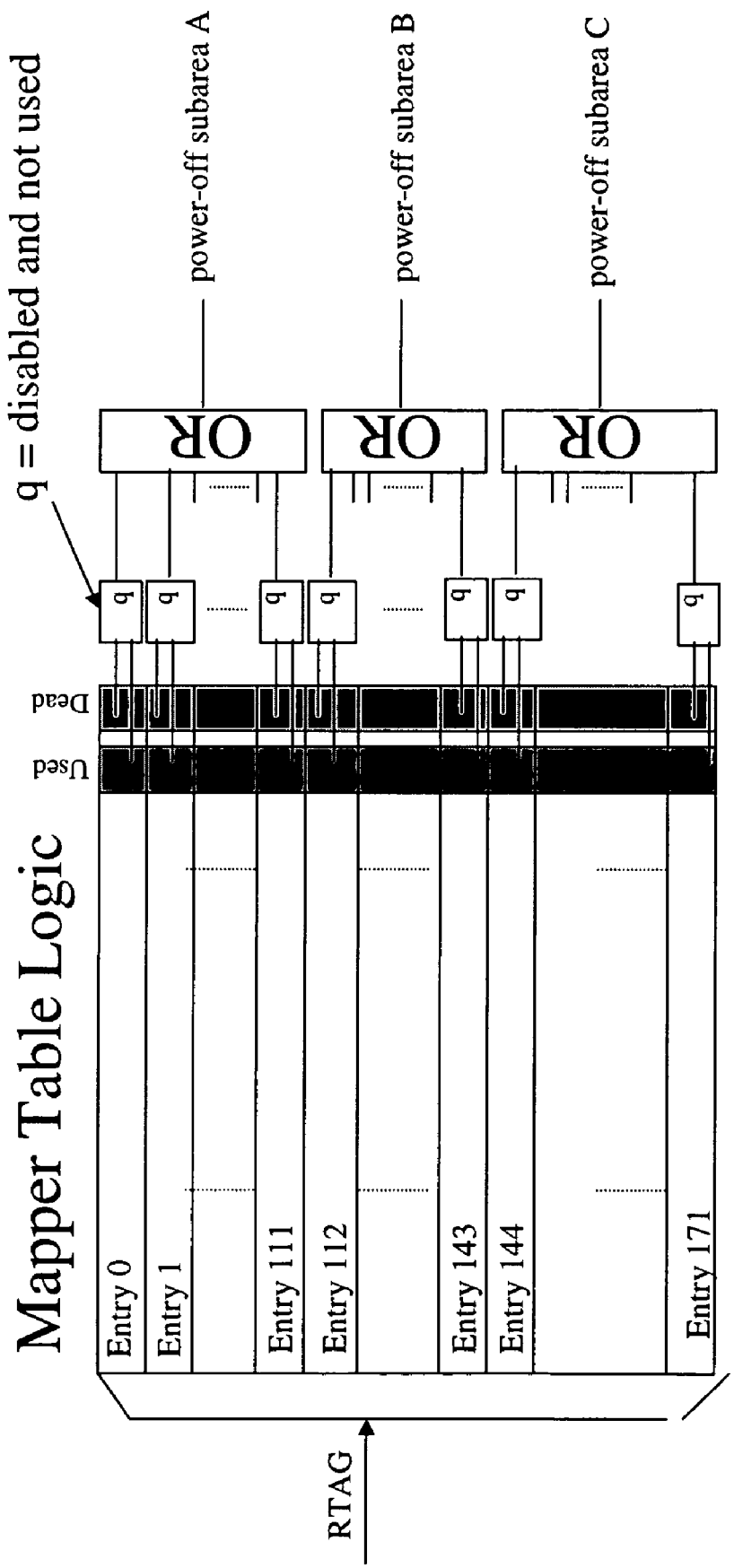
FIG. 5 illustrates a preferred embodiment of mapping table logic implemented within the mapping logic shown in FIG. 2.

With reference to FIG. 5 a preferred embodiment for an exemplary hardware implementation of loop 440-460 is given. "RTAG" means an encoded physical address of a register entry.

In order to determine whether a power saving technique, such as gating a power supply or decreasing the supply voltage, etc., can be applied to a given sub-area, the "DEAD" and "USED" bits are evaluated to determine whether an entry is disabled and not used by active processing threads for a specific period of time.

The result of the evaluation of all address space is combined for all entries of a sub-area, such that when all ammper logic table entries are flagged as disabled an not used, the whole sub-area is ready to be powered down. In case of several independent sub-areas, several such circuits may be implemented in parallel.

The disclosed method and logical functionality may be implemented entirely in hardware or software or a combination of both. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate physical design format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

What is claimed is:

1. A method for reducing power consumption associated with a register file of a processor supporting simultaneous multithreading processing(SMT), wherein a control logic element manages the allocation of register file resources with respect to specific ones of a plurality of program threads, the method comprising:

monitoring the number of currently executing or scheduled processing threads in the processor;

defining a minimum and maximum threshold of currently executing or scheduled processing threads for a given architected state triggering a change in the number of register file entries required to support SMT processing;

determining when a minimum or maximum threshold of currently executing or scheduled processing threads is reached;

identifying a sub-area of the register file to be disabled, such that current SMT processing requirements are satisfied;

controlling register file usage such that an address space corresponding to the register file sub-area is not used during future allocation of register entries;

checking whether all register entries in the register file sub-area are disabled or have not been used within a predefined timing period and are no longer in use;

disabling the address space of the register file sub-area;

applying a power saving technique for the register file sub-area selected for deactivation when no entries within the register file sub-area are required for the current operation of the processor;

marking all register entries associated with the register file sub-area selected for deactivation with a DEAD-flag bit; and restricting an allocation of new register entries to address ranges outside the address range of the register file sub-area.

2. The method according to claim 1, further comprising:

determining the number of register entries of the register file sub-area; and determining the number of register file entries of the register file are currently unused outside of the register file sub-area and within the register file;

moving data stored within the register file entries, including status information of the register file sub-area into respective currently unused registers outside of the register file sub-area, by means of intermediate memory storage; and updating a mapping list of the control logic accordingly.

3. The method according to claim 1, further comprising:

moving data comprised of architected register entries into memory; and loading back the data into a contiguous register file area not contained with the register file sub-area, wherein the DEAD flag bit is used for identifying a register address for which new data is not be allocated.

4. The method according to claim 1, wherein restricting the allocation of new register entries is facilitated by logically evaluating the DEAD flag bit and a "USED" bit prior to the allocation of new register entries.

5. The method according to claim 1, wherein the register file sub-area comprises a plurality of registers located in a contiguous physical region of a chip area.

6. The method according to claim 1, wherein the register file sub-area comprises a plurality of registers located within a contiguous address space of the processor.

7. The method according to claim 1, wherein the register file sub-area comprises a single register.

8. The method according to claim 1, wherein a dummy operation is added in order to accelerate the deactivation of architected register entries within the register file sub-area.

9. The method of claim 1, wherein the power saving technique comprises defining a first voltage island for a first address range of the register file sub-area that is independently controlled from a primary power supply for the processor.

10. The method of claim 1, wherein the power saving technique comprises lowering a supply voltage to the register file sub-area selected for deactivation.

11. The method of claim 1, wherein the power saving technique comprises gating a clock signal supplied to the register file sub-area selected for deactivation.

12. The method according to claim 1, for the case where an increase in the number of currently executing or scheduled processing threads requires an increase in register file resources to support SMT processing requirements, the method further comprising:

identifying a previously disabled sub-area of the register file to be reactivated, such that current SMT processing requirements is satisfied;

setting a DEAD flag bit and a USED bit in a mapping logic table entry corresponding to the previously disabled sub-area of the register file to enable allocation of register file entries to the previously disabled sub-area of the register file; and disabling the power saving technique.

13. An electronic data processing system including a register file of a processor supporting simultaneous multithreading, wherein a control logic element manages an allocation of register file resources with respect to specific ones of a plurality of program threads, comprising:

means for checking if a condition evaluates to be true, that a change of operation occurred which reduces the need of architectural register entries;

means for defining a sub-area of the register file by start address and end address, wherein said sub-area is dedicated to be switched off for future operation of the register file;

means for controlling the register file usage such that said sub-area is not used during future allocation of register entries;

means for checking whether all register entries in said sub-area are disabled and not in use any longer and is turned off;

means for applying a power saving technique for said sub-area when no entries within said sub-area are required any more for the current operation of the processor.

* * * * *